(12) United States Patent
Yuan et al.

(10) Patent No.: US 12,153,789 B2
(45) Date of Patent: Nov. 26, 2024

(54) VIDEO-BASED INTERACTION AND VIDEO PROCESSING METHODS, APPARATUS, DEVICE, AND STORAGE MEDIUM

(71) Applicants: Beijing Zitiao Network Technology Co., Ltd., Beijing (CN); Beijing Youzhuju Network Technology Co. Ltd., Beijing (CN)

(72) Inventors: Ye Yuan, Beijing (CN); Pengfei Ji, Beijing (CN); Yuchen Wang, Beijing (CN); Zhaoyiding Mai, Beijing (CN); Jiayi Shi, Beijing (CN); Ting Nie, Beijing (CN); Jingyu Zhang, Beijing (CN)

(73) Assignees: BEIJING ZITIAO NETWORK TECHNOLOGY CO., LTD., Beijing (CN); BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 18/090,323

(22) Filed: Dec. 28, 2022

(65) Prior Publication Data
US 2023/0161471 A1    May 25, 2023

Related U.S. Application Data

(63) Continuation of application No. PCT/CN2021/114669, filed on Aug. 26, 2021.

(30) Foreign Application Priority Data

Sep. 30, 2020   (CN) .......................... 202011060471.3

(51) Int. Cl.
G06F 3/0486    (2013.01)
G06F 3/0483    (2013.01)
(Continued)

(52) U.S. Cl.
CPC .......... G06F 3/0486 (2013.01); G06F 3/0483 (2013.01); G06F 9/453 (2018.02); G06F 3/016 (2013.01); G06F 3/167 (2013.01)

(58) Field of Classification Search
CPC ........ G06F 3/0486; G06F 3/167; G06F 3/016; G06F 3/0483; G06F 9/453
See application file for complete search history.

(56) References Cited

U.S. PATENT DOCUMENTS 10,540,056 B2 * 1/2020 Ying ................... H04N 21/4788
10,692,534 B2 * 6/2020 Yoshimine ............ G06F 3/0486
(Continued)

FOREIGN PATENT DOCUMENTS

CN    103229127 A    7/2013
CN    106990840 A    7/2017
(Continued)

OTHER PUBLICATIONS

International Search Report and Written Opinion mailed on Oct. 18, 2021, in related International patent application PCT/CN2021/114669.
(Continued)

*Primary Examiner* — Tadesse Hailu
(74) *Attorney, Agent, or Firm* — Astute IP Law Group

(57) ABSTRACT

Video-based interaction and video processing methods, an apparatus, a device, and a storage medium are provided. The video-based interaction method includes: in response to a target video being played back to a target image frame, displaying a mask comprising an interactive control on a video playback interface corresponding to the target image frame, the position of the display area of the interactive control on the mask having a correspondence with the display area of a target element on the target image frame, and the display image on the interactive control having a
(Continued)

An obscuration including an interaction control is displayed on a video play interface corresponding to a target image frame, in response to playing the target image frame in a target video — S101

A target page is displayed in response to a trigger operation on the interaction control, where content displayed on the target page is correlated with content displayed on the target image frame — S102 correspondence with the target element. When a trigger operation for the interactive control is received, a target page is displayed.

18 Claims, 4 Drawing Sheets

(51) Int. Cl.
*G06F 9/451* (2018.01)
*G06F 3/01* (2006.01)
*G06F 3/16* (2006.01)

(56) References Cited

U.S. PATENT DOCUMENTS

| | | | |
|---|---|---|---|
| 10,832,729 B2* | 11/2020 | Doherty | H04N 21/47217 |
| 2002/0089530 A1* | 7/2002 | Markel | H04N 21/8166 |
| | | | 348/E7.071 |
| 2002/0108124 A1 | 8/2002 | Sato | |
| 2003/0110499 A1 | 6/2003 | Knudson et al. | |
| 2005/0024322 A1* | 2/2005 | Kupka | G06F 3/04883 |
| | | | 345/156 |
| 2008/0276272 A1 | 11/2008 | Rajaraman et al. | |
| 2012/0163770 A1* | 6/2012 | Kaiser | H04N 21/4532 |
| | | | 386/E9.011 |
| 2013/0223818 A1* | 8/2013 | Wayans | G11B 27/102 |
| | | | 386/282 |
| 2014/0013196 A1* | 1/2014 | White | H04N 21/4788 |
| | | | 709/204 |
| 2016/0011758 A1* | 1/2016 | Dornbush | H04L 51/10 |
| | | | 715/764 |
| 2016/0124513 A1 | 5/2016 | Dal Zot et al. | |
| 2017/0200302 A1 | 7/2017 | Havemen | |
| 2018/0004396 A1* | 1/2018 | Ying | H04N 21/47217 |
| 2018/0035137 A1* | 2/2018 | Chen | H04N 21/8456 |
| 2018/0101723 A1* | 4/2018 | Wakako | G06V 20/40 |
| 2018/0225019 A1* | 8/2018 | Xie | G06F 3/04886 |
| 2019/0114047 A1* | 4/2019 | Kikin-Gil | G06T 11/60 |
| 2019/0160376 A1 | 5/2019 | Ito et al. | |
| 2019/0378319 A1* | 12/2019 | Yuan | G06T 13/80 |
| 2020/0304863 A1* | 9/2020 | Domm | H04L 67/55 |
| 2020/0336804 A1* | 10/2020 | Cui | H04N 21/4781 |
| 2021/0014570 A1* | 1/2021 | Weng | H04M 1/725 |

FOREIGN PATENT DOCUMENTS

| | | |
|---|---|---|
| CN | 108769814 A | 11/2018 |
| CN | 110062270 A | 7/2019 |
| CN | 110515455 A | 11/2019 |
| CN | 111026392 A | 4/2020 |
| CN | 111669639 A | 9/2020 |
| CN | 111698566 A | 9/2020 |
| CN | 112188255 A | 1/2021 |
| CN | 112198962 A | 1/2021 |
| JP | 2002238036 A | 8/2002 |
| JP | 2005210371 A | 8/2005 |
| JP | 2006101548 A | 4/2006 |
| JP | 2007096866 A | 4/2007 |
| JP | 2010526494 A | 7/2010 |

OTHER PUBLICATIONS

Office Action in Japanese Patent Application No. 2023-507659, mailed Mar. 19, 2024, 10 pages.
Office Action for Chinese Patent Application No. 202110926659.X, mailed Sep. 20, 2024, 21 pages.

* cited by examiner

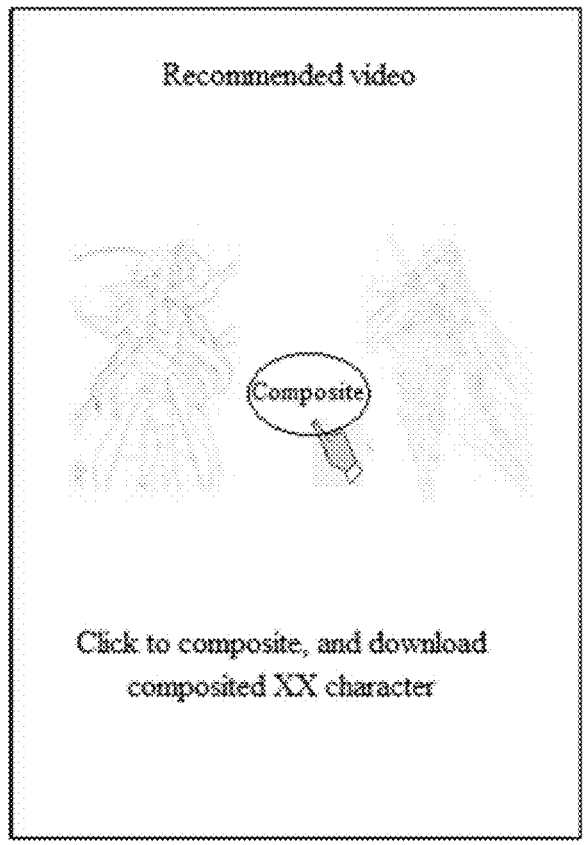

Figure 3

An interaction control is generated on an obscuration based on the target element on the target image frame, in response to a reception of a select operation on the target element on the target image frame of a to-be-processed video, where a display region of the interaction control on the obscuration corresponds to a display region of the target element on the target image frame, a display image of the interaction control corresponds to the target element, the interaction control is used to trigger a display of a target page, and the target page corresponds to the target image frame ⟵ S401

The obscuration is inserted between the target image frame and a first image frame in the to-be-processed video, to obtain a target video corresponding to the to-be-processed video, where the first image frame is an image frame next to the target image frame in the to-be-processed video ⟵ S402

VIDEO-BASED INTERACTION AND VIDEO PROCESSING METHODS, APPARATUS, DEVICE, AND STORAGE MEDIUM

This application is a continuation of International Application No. PCT/CN2021/114669, filed on Aug. 26, 2021 which claims priority to Chinese application No. 202011060471.3, titled "VIDEO-BASED INTERACTION METHOD, VIDEO PROCESSING METHOD, APPARATUSES THEREOF, DEVICE, AND STORAGE MEDIUM", filed Sep. 30, 2020, with the China National Intellectual Property Administration, both of which are incorporated herein by reference in their entireties.

FIELD

The present application relates to the field of data processing, and in particular to a video-based interaction method and apparatus, a video processing method and apparatus, a device and a storage medium.

BACKGROUND

With the continuous increase in the number of users of short video software, video-based interaction methods have attracted more and more attention.

On the premise of ensuring user experience, switching from a video playback to target page display is a technical problem to be solved at present.

SUMMARY

In order to solve or at least partially solve the above-described technical problem, a video-based interaction method and apparatus, a video processing method and apparatus, a device, and a storage medium are provided according to the present disclosure, which can realize the switching from the video playback to the target page display on the premise of ensuring user experience.

In a first aspect, a video-based interaction method is provided according to the present disclosure, the method including:

displaying an obscuration including an interaction control on a video play interface corresponding to a target image frame, in response to playing the target image frame in a target video, where a display region of the interaction control on the obscuration has the same position as a display region of a target element on the target image frame, and a display image on the interaction control corresponds to the target element, and displaying a target page in response to a trigger operation on the interaction control, where content displayed on the target page is correlated with content displayed on the target image frame.

In an implementation, the method further includes:
jumping from the target page to the video play interface in response to a return operation triggered on the target page, and continuing to play the target video on the video play interface based on the target image frame.

In an implementation, the method further includes:
continuing to play the target video based on the target image frame, in response to a display duration of the obscuration on the video play interface reaching a predetermined stay duration, or
continuing to play the target video based on the target image frame, in response to a reception of a playing resuming operation triggered on the obscuration of the video play interface.

In an implementation, before displaying a target page in response to a trigger operation on the interaction control, the method further includes:
displaying, on the obscuration, an operation prompt corresponding to the interaction control, where the control prompt is used to guide a user to perform the trigger operation on the interaction control.

In an implementation, the method further includes:
playing an audio prompt or a vibration prompt in response to the trigger operation on the interaction control.

In an implementation, the trigger operation on the interaction control includes: a click operation on the interaction control, or an operation of dragging the interaction control to a target region.

In a second aspect, a video processing method is provided according to the present disclosure, the method including:
generating an interaction control on an obscuration based on a target element on a target image frame, in response to a reception of a select operation on the target element on the target image frame of a to-be-processed video, where a display region of the interaction control on the obscuration has the same position as a display region of the target element on the target image frame, a display image of the interaction control corresponds to the target element, the interaction control is used to trigger a display of a target page, and content displayed on the target page is correlated with content displayed on the target image frame, and
inserting the obscuration between the target image frame and a first image frame in the to-be-processed video, to obtain a target video corresponding to the to-be-processed video, where the first image frame is an image frame next to the target image frame in the to-be-processed video.

In an implementation, the generating the interaction control on the obscuration based on a target element on a target image frame includes:
determining display position information of the target element on the target image frame, and
generating the interaction control corresponding to the target element on the obscuration based on the display position information.

In an implementation, after generating the interaction control on the obscuration based on the display position information, the method further includes:
determining display position information of a display element corresponding to the target element, on the target image frame, and
determining, on the obscuration, a target region corresponding to the interaction control, based on the display position information of the display element, where an operation of dragging the interaction control to the target region is used to trigger a display of the target page.

In an implementation, the method further includes:
determining a predetermined stay duration corresponding to the obscuration, where the predetermined stay duration is used to control a display duration of the obscuration.

In a third aspect, a video-based interaction apparatus is provided according to the present disclosure. The apparatus includes an obscuration displaying module and a page displaying module.

The obscuration displaying module is configured to display an obscuration including an interaction control, on a video play interface corresponding to a target image frame, in response to playing the target image frame in a target video, where a display region of the interaction control on the obscuration has the same position as a display region of a target element on the target image frame, and a display image on the interaction control corresponds to the target element.

The page displaying module is configured to display a target page in response to a trigger operation on the interaction control, where the target page corresponds to the target image frame.

In a fourth aspect, a video processing apparatus is provided according to the present disclosure. The apparatus includes a generating module and an inserting module.

The generating module is configured to generate an interaction control on an obscuration based on a target element on a target image frame, in response to a reception of a select operation on the target element on the target image frame of a to-be-processed video, where a display region of the interaction control on the obscuration has the same position as a display region of the target element on the target image frame, a display image of the interaction control is determined based on the target element, the interaction control is used to trigger a display of a target page, and the target page corresponds to the target image frame.

The inserting module is configured to insert the obscuration between the target image frame and a first image frame in a target video, to obtain a processed target video, where the first image frame is an image frame next to the target image frame in the target video.

In a fifth aspect, a computer readable storage medium is provided according to the present disclosure, where instructions are stored on the computer readable storage medium, and the instructions, when executed by a terminal device, cause the terminal device to implement the above-described methods.

In a sixth aspect, a device is provided according to the present disclosure, which includes a memory, a processor, and a computer program stored on the memory and executable on the processor, where the processor when executing the computer program, implements the above-described method.

The technical solutions according to the embodiments of the present disclosure have the following advantages over conventional technology.

In the video-based interaction method according to the embodiments of the present disclosure, playing of a target video is paused in response to playing the target image frame in the target video, and an obscuration including an interaction control is displayed on a video play interface corresponding to the target image frame. A display region of the interaction control on the obscuration corresponds to a display region of a target element on the target image frame, and a display image on the interaction control corresponds to the target element. A target page is displayed when a trigger operation on the interaction control is received, where the target page corresponds to the target image frame. According to the embodiments of the present disclosure, an interaction control is displayed on the video play interface. The interaction control corresponds to the display region of the target element on the target image frame, and the display image of the interaction control corresponds to the target element. A display function for switching from the video play interface to the target page is achieved by the trigger operation on the interaction control.

In addition, the display of the interaction control is related to original display content on the target image frame, according to the embodiments of the present disclosure. Therefore, the obscuration including the interaction control is displayed on the video display interface of the target video, and the display of a target webpage related to the target image frame is triggered based on the interaction control related to the original display content on the target image frame. In this way, a user can browse the target page in an immersive manner by switching from the video play interface, thereby guaranteeing user experience.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

In order to more clearly illustrate the embodiments of the present disclosure or the technical solutions in the conventional technology, the accompanying drawings for description of the embodiments or the conventional technology will be briefly introduced below. Apparently, other drawings can also be obtained from these drawings by those of ordinary skills in the art without any inventive efforts.

FIG. 3 is a rendering drawing of an interface of an obscuration including an interaction control according to an embodiment of the present disclosure;

FIG. 4 is a flowchart of a video processing method according to an embodiment of the present disclosure;

DETAILED DESCRIPTION OF EMBODIMENTS

Figure 1:
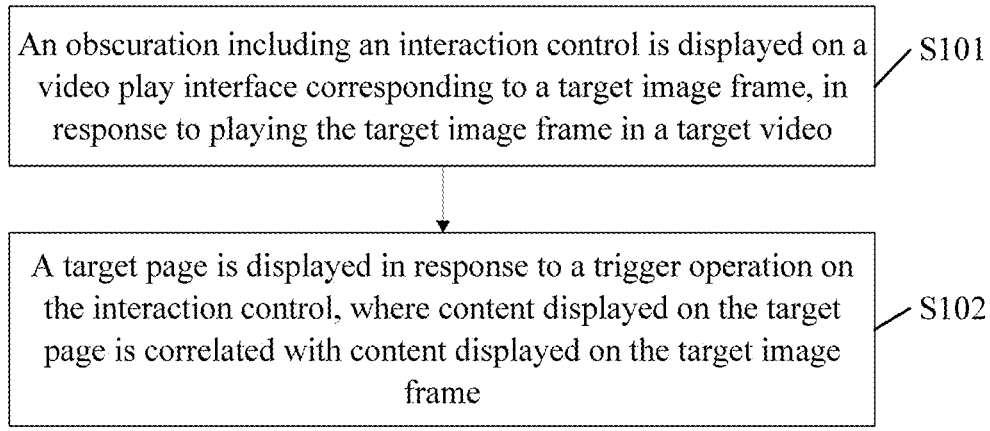
FIG. 1 is a flowchart of a video-based interaction method according to an embodiment of the present disclosure.

In order to more clearly understand the above objects, features and advantages of the present disclosure, the solutions of the present disclosure are further described below. It should be noted that the embodiments of the present disclosure and the features in the embodiments may be combined with each other under the condition of no conflict therebetween.

Many specific details are set forth in the following description to facilitate a full understanding of the present disclosure, while the present disclosure can also be implemented in other ways different from those described herein. Apparently, the embodiments in the specification are only some rather than all of the embodiments of the present disclosure.

With the rapid increase in the number of users of short video software, how to ensure the user experience in short video software has attracted more and more attention from developers. The video-based interaction method is one of the important factors to ensure the user experience of short video software. Therefore, the video-based interaction method has also attracted much attention.

The present disclosure provides a video-based interaction method. In the method, playing of a target video is paused in response to playing the target image frame in the target video, and an obscuration including an interaction control is displayed on a video play interface corresponding to the target image frame. A display region of the interaction control on the obscuration has the same position as a display region of a target element on the target image frame, and a display image on the interaction control corresponds to the target element. A target page is displayed when a trigger operation on the interaction control is received, where the target page corresponds to the target image frame. According to the embodiments of the present disclosure, an interaction control is displayed on the video play interface. The interaction control has the same position as the display region of the target element on the target image frame, and the display image of the interaction control corresponds to the target element. A display function for switching from the video play interface to the target page is achieved by the trigger operation on the interaction control.

In addition, the display of the interaction control is implemented based on the display region of the target element on the target image frame according to the embodiments of the present disclosure. That is, the display of the interaction control is related to original display content on the target image frame. Therefore, the obscuration including the interaction control is displayed on the video display interface of the target video, and the display of a target webpage related to the target image frame is triggered based on the interaction control related to the original display content on the target image frame. In this way, a user can browse the target page in an immersive manner by switching from the video play interface, thereby guaranteeing user experience.

On this basis, a video-based interaction method is provided according to an embodiment of the present disclosure. FIG. 1 is a flowchart of a video-based interaction method according to an embodiment of the present disclosure. Referring to FIG. 1, the method includes S101 to S102.

In S101, an obscuration including an interaction control is displayed on a video play interface corresponding to a target image frame, in response to playing the target image frame in a target video.

A display region of the interaction control on the obscuration has the same position as a display region of a target element on the target image frame, and a display image on the interaction control corresponds to the target element.

In an embodiment of the present disclosure, the target video refers to a video or a video segment with a certain play duration. One or more image frames next to the target image frame in the target video are used to display the obscuration. That is, the target video includes at least one image frame in which the obscuration is displayed. For example, image frames at playing time instants from fifth second to seventh second in the target video are used to display the obscuration.

In practice, in a process of playing of the target video, when the target image frame is being played, an obscuration may be displayed on a play interface corresponding to the target image frame, and playing of the target video is paused. An interaction control is displayed on the obscuration displayed on the video play interface, and a display region of the interaction control on the obscuration corresponds to a display region of the target element on the target image frame. Specifically, a position of the display region of the interaction control on the obscuration coincides with a position of the display region of the target element on the target image frame. As the obscuration may be displayed in a certain transparency, the display region of the interaction control displayed on the obscuration overlaps with the display region of the target element on the target image frame for the user.

In addition, there is a correspondence between the display image on the interaction control and the target element. Specifically, the display image on the interaction control may be the same as or similar to a display image of the target element.

In an optional embodiment, a single interaction control may be displayed on the obscuration, or multiple interaction controls may be concurrently displayed the obscuration. The number of the interaction controls may be determined based on display requirements of a target page. Specifically, different interaction controls are used to trigger the display of different target pages. For example, the target page is an advertisement page designed based on display content on the target image frame, and different interaction controls can be used to trigger different advertisement pages designed based on the display content on the target image frame.

In practice, since the obscuration may be displayed in a certain transparency, an image on the target image frame can be indistinctly displayed when the obscuration is displayed on the video play interface corresponding to the target image frame. Besides, the target image frame in the target video is determined based on setup requirements of the obscuration.

Figure 2:
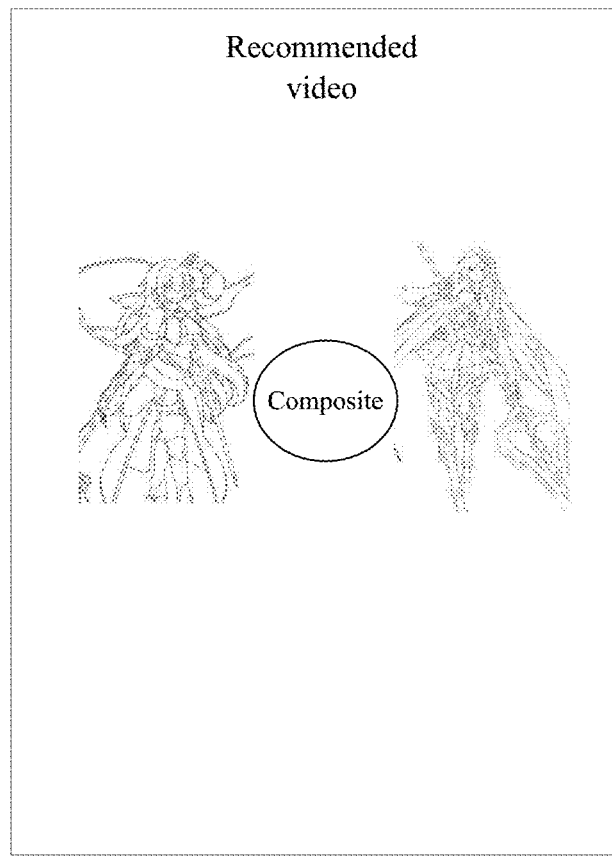
FIG. 2 is a rendering drawing of an interface of a target image frame of a target video according to an embodiment of the present disclosure.

In order to more clearly describe the embodiments of the present disclosure, reference is made to FIG. 2, which is a rendering drawing of an interface of a target image frame of a target video according to an embodiment of the present disclosure. In practice, when the target image frame in the target video is played, the obscuration including the interaction control is displayed on the video play interface corresponding to the target image frame. FIG. 3 is a rendering drawing of an interface in which an obscuration including an interaction control is displayed according to an embodiment of the present disclosure. Referring to FIG. 3, the display region of the interaction control "Composite" on the obscuration in FIG. 3 overlaps with the display region of the target element "Composite" on the target image frame in FIG. 2.

In an embodiment of the present disclosure, the display image on the interaction control is the same as the display image corresponding to the target element on the target image frame. For example, the image of the word "Composite" with a yellow background displayed on the interaction control "Composite" in FIG. 3 is the same as the display image of the target element "Composite" on the target image frame in FIG. 2.

In an embodiment of the present disclosure, the interaction control displayed on the obscuration is set based on an original display element in the target image frame, so that the content displayed on the obscuration for a user does not deviate from the content of the target video, thereby avoiding exceeding the degree of sensory acceptance of the user, and guaranteeing user experience.

In an optional embodiment, in addition to the interaction control, an operation prompt corresponding to the interaction control may also be displayed on the obscuration. As shown in FIG. 3, besides the interaction control "Composite", an operation prompt "Click to composite, and download composited XX character" are displayed on the obscuration, so as to guide the user to perform a trigger operation on the interaction control, and provide the user with an expectation for the content on the target page after the interaction control is triggered.

In S102, a target page is displayed in response to a trigger operation on the interaction control, where content displayed on the target page is correlated with content displayed on the target image frame.

In an embodiment of the present disclosure, the video play interface is jumped to the target page to display the target page, when a trigger operation of the user on the interaction control is detected on the obscuration displayed on the video play interface corresponding to the target image frame. There is a correspondence between the target page and the target image frame, and the target page is generally set based on display content on the target image frame, such as an advertisement page, a personal home page, or an official account home page.

The trigger operation on the interaction control may include: a click operation on the interaction control, or an operation of dragging the interaction control to a target region. The specific implementations thereof are introduced in the following embodiments.

As shown in FIG. 3, when a click operation of the user on the interaction control "Composite" is detected, the current video play interface is jumped to a download page of "Composited XX character", to display the download page of the "Composited XX character". The user can download the "Composited XX character" based on the display of the download page. In addition, in the process of playing of the video, a download page of the "Composited XX character" is displayed by guiding the user to click the "Composite" button, and thus downloads of the "Composited XX character" can be increased.

In the above possible implementation, the play interface of the target video is jumped to the target page by triggering the interaction control on the obscuration by the user. In an embodiment, the target page may be jumped back to the video play interface of the target video by triggering a return operation by the user. In an embodiment, the following step S103 may be performed.

In S103, the target page is jumped to the video play interface in response to a return operation triggered on the target page, and the target video is continued to be played on the video play interface based on the target image frame.

In an embodiment of the present disclosure, in the display process of the target page, subsequent video frames of the target video may be played in response to triggering a return operation on the target page by the user. In an embodiment, when the return operation triggered on the target page is received, the target page is jumped back to the video play interface, and the subsequent video frames of the target video are played on the video play interface. Specifically, the playing of the target video may be resumed from the target image frame, or the playing of the target video may be resumed based on a frame next to the target image frame. That is, an image frame from which the playing of the target video is resumed may be determined based on the target image frame.

In an optional implementation, in order to prompt the user of the effectiveness of the trigger operation on the interaction control, an audio prompt or a vibration prompt is played when the trigger operation on the interaction control is received in an embodiment of the present disclosure, to prompt the user that the trigger operation has been effected and guarantee interaction experience of the user.

In an optional implementation, the display of the obscuration on the video play interface may be timed, when the obscuration is displayed on the video play interface corresponding to the target image frame. The playing of the target video is continued to be played upon the display duration of the obscuration on the video play interface reaches a predetermined stay duration.

The display duration of the obscuration on the video play interface reaching the predetermined stay duration indicates that the user does not trigger the interaction control displayed on the obscuration within a time period of displaying the overlay. Therefore, in order to guarantee video play experience of the user, the display interface of the obscuration is switched to the video play interface, to continue to play the subsequent image frames of the target video.

In an optional implementation, the user may actively trigger resume of the playing of the target video, when the obscuration is displayed on the video play interface corresponding to the target image frame. Specifically, the target video is continued to be played based on the target image frame, when a playing resuming operation triggered on the obscuration on the video play interface is received.

In the video-based interaction method according to the embodiments of the present disclosure, playing of a target video is paused in response to playing the target image frame in the target video, and an obscuration including an interaction control is displayed on a video play interface corresponding to the target image frame. A display region of the interaction control on the obscuration has the same position of a display region of a target element on the target image frame, and a display image on the interaction control corresponds to the target element. A target page is displayed when a trigger operation on the interaction control is received, where content displayed on the target page is correlated with content displayed on the target image frame. The target page is jumped to the video play interface when a return operation triggered on the target page is received, and the target video is continued to be played on the video play interface based on the target image frame. According to the embodiments of the present disclosure, an interaction control is displayed on the video play interface. The interaction control corresponds to the display region of the target element on the target image frame, and the display image of the interaction control corresponds to the target element. A display function for switching from the video play interface to the target page is achieved by the trigger operation on the interaction control.

In addition, the display of the interaction control is related to original display content on the target image frame according to the embodiments of the present disclosure. Therefore, the obscuration including the interaction control is displayed on the video display interface of the target video, and the display of a target webpage related to the target image frame is triggered based on the interaction control related to the original display content on the target image frame. In this way, a user can browse the target page in an immersive manner by switching from the video play interface, thereby guaranteeing user experience.

Based on the above embodiments, a video processing method is further provided according to the present disclosure. In the method, a to-be-processed video is processed to obtain the target video in the video-based interaction method according to the above embodiments.

With reference to FIG. 4, which is a flowchart of a video processing method according to an embodiment of the present disclosure. The video processing method includes S401 and S402.

In S401, an interaction control is generated on an obscuration based on the target element on the target image frame, in response to a reception of a select operation on the target element on the target image frame of a to-be-processed video.

A display region of the interaction control on the obscuration has the same position as a display region of the target element on the target image frame. There is a correspondence between a display image of the interaction control and the target element. The interaction control is used to trigger a display of a target page. Content displayed on the target page is correlated with content displayed on the target image frame.

In an embodiment of the present disclosure, the to-be-processed video may be any type of video or video segment with a play duration, such as a game video segment or a tourism video segment.

In an embodiment of the present disclosure, after the to-be-processed video is determined, a target image frame in the to-be-processed video is determined first. Generally, the target image frame is determined based on setup requirements of the obscuration. For example, if the obscuration is set to be displayed on the twenty-fifth image frame of the to-be-processed, the twenty-fifth image frame of the to-be-processed may be determined as the target image frame.

In an optional implementation, a user may determine an image frame of the to-be-processed video as the target image frame based on setup requirements.

In addition, after the target image frame in the to-be-processed video is determined, a target element on the target image frame is determined. Generally, the target element is determined based on setup requirements of the interaction control on the obscuration. For example, if the interaction control on the obscuration is set to an image pattern displayed on the target image frame, such as the image pattern "Composite" in FIG. 2, the image pattern "Composite" may be determined as the target element on the target image frame.

In practice, the target image frame may include at least one display element. After the target image frame is determined, at least one display element on the target image frame is selected as the target element, which is used to generate the interaction control. Specifically, after a select operation on the target element on the target image frame is received, the interaction control is generated based on the target element.

In an embodiment of the present disclosure, after the target element on the target image frame in the to-be-processed video is determined, an interaction control corresponding to a display region of the target element on the target image frame is generated on the obscuration, so that the interaction control displayed on the obscuration overlaps with or is close to the display region of the target element on the target image frame. In an embodiment, an interaction control having the same position as the display region of the target element on the target image frame is generated on the obscuration.

In practice, before the interaction control is generated on the obscuration, display position information of the target element on the target image frame in the to-be-processed video may be determined, where the display position information of the target element is used to determine a display position of the target element on the target image frame. Specifically, the display position information may include coordinates of pixels on a boundary of the target element, and may further include coordinates of a central point of the target element and a display shape of the target element.

After the display position information of the target element is determined, an interaction control corresponding to the target element is generated on the obscuration based on the display position information. In an embodiment, a display position of the interaction control on the obscuration is the same as a display position of the target element on the target image frame. That is, when the obscuration is displayed on the video play interface corresponding to the target image frame, the display region of the interaction control displayed on the obscuration overlaps with that of the target element corresponding to the interaction control.

In addition, the interaction control generated on the obscuration may be used to trigger a display of the target page. Specifically, a click operation or a move operation on the interaction control may be used to trigger the display of the target page. For example, the target page may be displayed in response to a click operation of a user on the interaction control. Alternatively, the target user may be displayed in response to a drag operation triggered by the user on the interaction control, for example, moving the interaction control to a target region. In an embodiment, a trigger operation on the interaction control may be set to any type of interaction operations, which will not be limited in the embodiments of the present disclosure.

In addition, the target page may be a page determined based on the content on the target image frame, such as an advertisement page and an official account home page.

In an optional implementation, when a click operation on the interaction control is set to trigger the display of the target page, a click range needs to be set for the click operation on the interaction control. In an embodiment, the display region corresponding to the interaction control may be determined as the click range of the click operation on the interaction control, and the display of the target page is triggered upon detecting a click operation triggered by the user within the click range.

In addition, in order to enrich the display content on the obscuration, other display elements on the target image frame may also be displayed on the obscuration. Specifically, for each display element, a display region of the display element on the obscuration has the same position as a display region of display element on the target image frame.

Figure 5:
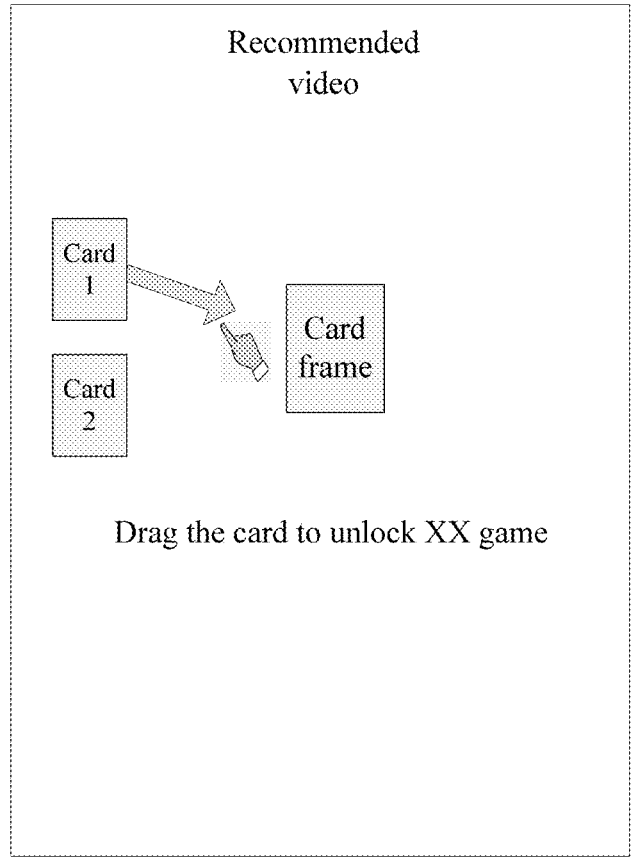
FIG. 5 is a rendering drawing of an interface of an obscuration according to an embodiment of the present disclosure.

In an optional implementation, when the operation of dragging the interaction control to the target region is set to trigger the display of the target page, display position information may be set for the target region. In an embodiment, a display element corresponding to the target element may be determined on the target image frame, and display position information of the display element is determined on the target image frame. Reference is made to FIG. 5, which is a rendering drawing of an interface of an obscuration according to an embodiment of the present disclosure. Card 1 is the target element on the target image frame, and a display element corresponding to card 1 is a card frame. Display position information of the card frame on the target image frame is determined, and a target region corresponding to the card 1, that is, a display region of the card frame, is determined on the obscuration based on the display position information of the card frame. The display of the target page is triggered when an operation of dragging the interaction control to the target region is detected in the target region.

In addition, a drag operation prompt for the interaction control may be set on the obscuration, which may specifically include a dragging gesture animation prompt or a dragging text prompt. As shown in FIG. 5, a dragging gesture animation prompt for the interaction control "Card 1" is set on the obscuration, which is used to guide a user to drag the card 1 to the target region. In an embodiment, the times of dragging gesture animations may be displayed on the display interface of the obscuration. A text prompt of "Drag the card to unlock XX game" is set on the obscuration, which is used to guide the user to perform a trigger operation on the interaction control and provide the user with an expectation for content on the target page after triggering the interaction control, thereby guaranteeing interaction experience for the user.

In an optional implementation, in order to avoid degrading use experience of the user due to staying on the display interface of the obscuration for a long time, a stay duration may be set to control a display duration of the obscuration. In an embodiment, a predetermined stay duration corresponding to the obscuration may be determined according to setup requirements of the obscuration. Switching from the display interface of the obscuration to a display interface of a next image frame is triggered in response to the display duration of the obscuration reaching the predetermined stay duration, to play a subsequent video for the user.

In addition, in order to prompt the user of the effectiveness of the trigger operation on the interaction control, a corresponding audio or vibration prompt after triggering may be set for the interaction control on the obscuration according to an embodiment of the present disclosure, to prompt the user that the trigger operation has been effected, thereby guaranteeing interaction experience of the user.

In addition, a visual effect after triggering may be set for the interaction control on the obscuration according to an embodiment of the present disclosure, to prompt the user of the effectiveness of the operation of triggering the interaction control, thereby improving interaction experience of the user.

In S402, the obscuration is inserted between the target image frame and a first image frame in the to-be-processed video, to obtain a target video corresponding to the to-be-processed video, where the first image frame is an image frame next to the target image frame in the to-be-processed video.

In an embodiment of the present disclosure, after the interaction control is generated on the obscuration and an interaction operation is set for the interaction control, the obscuration is inserted between the target image frame and the first image frame in the to-be-processed video, to obtain the target video corresponding to the to-be-processed video.

The first image frame is an image frame next to the target image frame in the to-be-processed video. For example, if the target image frame is the fifth image frame in the to-be-processed video, the first image frame is the sixth image frame in the to-be-processed image frame, and the obscuration is inserted between the fifth image frame and the sixth image frame in the to-be-processed video.

In addition, a return operation triggered by the user may be detected after the target page is accessed. In response to the return operation triggered by the user, the target video may be continued to be played by returning to a play interface of the above-described fifth or sixth image frame.

In the video processing method according to the embodiments of the present disclosure, after the user selects the target element on the target image frame in the to-be-processed video, an interaction control for switching to the target page can be automatically generated on the obscuration for the user, and a target video can be automatically generated for the user after the obscuration is inserted into the to-be-processed video. As can be seen, the video processing method according to the embodiments of the present disclosure lowers the operating threshold for the user to perform video processing, and improves the operating experience of video processing for the user.

Figure 6:
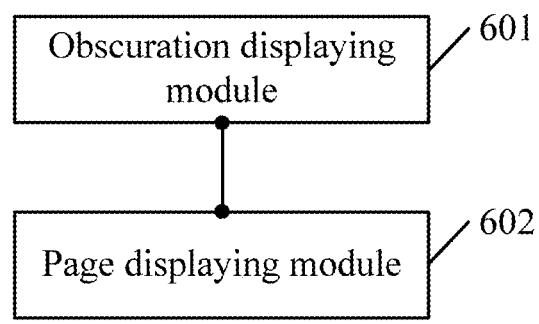
FIG. 6 is a structural diagram of a video-based interaction apparatus according to an embodiment of the present disclosure.

Based on the same inventive idea as the above method embodiments, a video-based interaction apparatus is further provided according to the present disclosure. FIG. 6 is a structural diagram of a video-based interaction apparatus according to an embodiment of the present disclosure. Referring to FIG. 6, the apparatus includes: an obscuration displaying module 601 and a page displaying module 602.

The obscuration displaying module 601 is configured to display an obscuration including an interaction control on a video play interface corresponding to a target image frame, in response to playing the target image frame in a target video, where a display region of the interaction control on the obscuration has the same position as a display region of a target element on the target image frame, and a display image on the interaction control corresponds to the target element.

The page displaying module 602 is configured to display a target page, in response to a trigger operation on the interaction control, where content displayed on the target page is correlated with content displayed on the target image frame.

In an optional implementation, the apparatus further includes: a jumping module configured to jump from the target page to the video play interface in response to a return operation triggered on the target page, and continuing to play the target video on the video play interface based on the target image frame.

In an optional implementation, the apparatus further includes: a first playing module configured to continue to play the target video based on the target image frame, in response to a display duration of the obscuration on the video play interface reaching a predetermined stay duration, or continue to play the target video based on the target image frame, in response to a reception of a playing resuming operation triggered on the obscuration on the video play interface.

In an optional implementation, the apparatus further includes: a displaying module configured to display, on the obscuration, an operation prompt corresponding to the interaction control, where the control prompt is used to guide a user to perform the trigger operation on the interaction control.

In an optional implementation, the apparatus further includes: a prompting module configured to play an audio prompt or a vibration prompt in response to the trigger operation on the interaction control.

In an optional implementation, the trigger operation on the interaction control includes: a click operation on the interaction control, or an operation of dragging the interaction control to a target region.

In the video-based interaction apparatus according to the embodiments of the present disclosure, playing of a target video is paused in response to playing a target image frame in the target video and an obscuration including an interaction control is displayed on a video play interface corresponding to the target image frame. A display region of the interaction control on the obscuration has the same position as a display region of a target element on the target image frame, and there is a correspondence between a display image on the interaction control and the target element. A target page is displayed when a trigger operation on the interaction control is received, where content displayed on the target page is correlated with content displayed on the target image frame. According to the embodiments of the present disclosure, an interaction control is displayed on the video play interface. The interaction control corresponds to the display region of the target element on the target image frame, and the display image of the interaction control corresponds to the target element. A display function for switching from the video play interface to the target page is achieved by the trigger operation on the interaction control. The target page is jumped to the video play interface when a return operation triggered on the target page is received, and the target video is continued to be played on the video play interface based on the target image frame.

In addition, the display of the interaction control is implemented based on the display region of the target element on the target image frame according to the embodiments of the present disclosure. That is, the display of the interaction control is related to original display content on the target image frame. Therefore, the obscuration including the interaction control is displayed on the video display interface of the target video, and the display of a target webpage related to the target image frame is triggered based on the interaction control related to the original display content on the target image frame. In this way, a user can browse the target page in an immersive manner by switching from the video play interface, thereby guaranteeing user experience.

Figure 7:
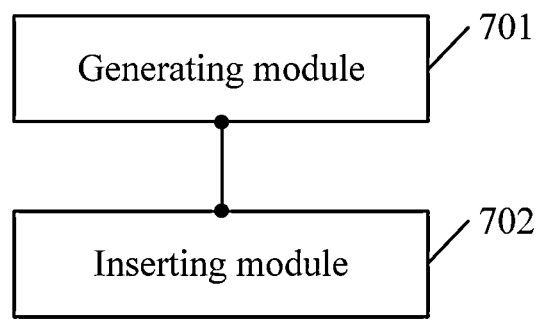
FIG. 7 is a structural diagram of a video processing apparatus according to an embodiment of the present disclosure.

In addition, based on the same inventive idea as the above method embodiments, a video processing apparatus is further provided according to an embodiment of the present disclosure. FIG. 7 is a structural diagram of a video processing apparatus according to an embodiment of the present disclosure. Referring to FIG. 7, the apparatus includes: a generating module 701 and an inserting module 702.

The generating module 701 is configured to generate an interaction control on an obscuration based on a target element on a target image frame, in response to a reception of a select operation on the target element on the target image frame of a to-be-processed video, where a display region of the interaction control on the obscuration is the same as a display region of the target element on the target image frame, a display image of the interaction control corresponds to the target element, the interaction control is used to trigger a display of a target page, and content displayed on the target page is correlated with content displayed on the target image frame.

The inserting module 702 is configured to insert the obscuration between the target image frame and a first image frame in a target video, to obtain a processed target video, where the first image frame is an image frame next to the target image frame in the target video.

In an optional implementation, the generating module includes: a first determining sub-module and a generating sub-module.

The first determining sub-module is configured to determine display position information of the target element on the target image frame.

The generating sub-module is configured to generate the interaction control corresponding to the target element on the obscuration based on the display position information.

In an optional implementation, the generating module further includes: a second determining sub-module and a third determining sub-module.

The second determining sub-module is configured to determine display position information of a display element corresponding to the target element, on the target image frame.

The third determining sub-module is configured to determine, on the obscuration, a target region corresponding to the interaction control, based on the display position information of the display element, where an operation of dragging the interaction control to the target region is used to trigger a display of the target page.

In an optional implementation, the apparatus further includes: a determining module configured to determine a predetermined stay duration corresponding to the obscuration, where the predetermined stay duration is used to control a display duration of the obscuration.

In the video processing apparatus according to the embodiments of the present disclosure, after the user selects the target element on the target image frame in the to-be-processed video, an interaction control for jumping to the target page can be automatically generated on the obscuration for the user. A target video can be automatically generated for the user after the obscuration is inserted into the to-be-processed video. As can be seen, the video processing method according to the embodiments of the present disclosure lowers the operating threshold for the user to perform video processing, and improves the operating experience of video processing for the user.

In addition to the above methods and apparatuses, a computer readable storage medium is further provided according to an embodiment of the present disclosure, where instructions are stored on the computer readable storage medium. The instructions, when executing on a terminal device, cause the terminal device to implement the above-described video-based interaction method or video processing method according to the embodiments of the present disclosure.

Figure 8:
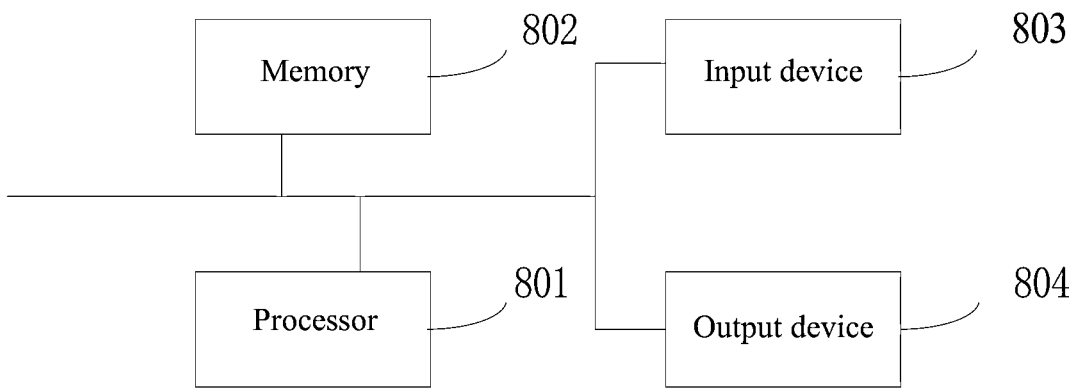
FIG. 8 is a structural diagram of a video-based interaction device according to an embodiment of the present disclosure.

In addition, a video-based interaction device is further provided according to an embodiment of the present disclosure. Referring to FIG. 8, the video-based interaction device may include: a processor 801, a memory 802, an input device 803 and an output device 804.

The number of processors 801 in the video-based interaction device may be one or more, and one processor is taken as an example in FIG. 8. In some embodiments of the present disclosure, the processor 801, the memory 802, the input device 803, and the output device 804 may be connected by a bus or in other ways, where the connection by a bus is taken as an example in FIG. 8.

The memory 802 can be used to store software programs and modules, and the processor 801 executes various functional applications and data processing of the video-based interaction device by running the software programs and modules stored in the memory 802. The memory 802 may mainly include a program storage area and a data storage area, where the program storage area may store an operating system, and an application program for at least one function. Additionally, the memory 802 may include a high-speed random access memory, and may also include a non-volatile memory, such as at least one magnetic disk storage device, flash memory device, or other volatile solid state storage device. The input device 803 may be used to receive input numerical or character information, and to generate signal input related to user settings and functional control of the video-based interaction device.

Specifically in this embodiment, the processor 801 loads the executable files corresponding to the processes of one or more application programs into the memory 802 according to the following instructions, and runs the application programs stored in the memory 802, so as to realize various functions of the above-described video-based interaction device or video processing device.

It should be noted that, in this disclosure, relational terms such as "first" and "second" etc. are only used to distinguish one entity or operation from another entity or operation, and do not necessarily require or imply there is such an actual relationship or sequence between these entities or operations. Moreover, the terms "include", "comprise" or any other variation thereof are intended to encompass non-exclusive inclusion such that a process, method, article or device including a list of elements includes not only those elements, but also includes other elements not explicitly listed or elements inherent to such a process, method, article or device. Without further limitation, an element preceded by the statement "comprising a . . . " does not preclude the presence of additional identical elements in a process, method, article or device that includes the element.

The above-described are only some specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not limited to the embodiments described herein, but is to be accorded the widest scope consistent with the principles and novel features disclosed herein.

The invention claimed is:

1. A video-based interaction method, comprising:
displaying an obscuration including an interaction control on a play interface corresponding to a target image frame of a target video and pausing the target video, in response to playing the target image frame of the target video, wherein a display region of the interaction control on the obscuration has a same position as a display region of a target element on the target image frame, and the interaction control has a same or similar display image as the target element;
displaying a target page in response to a trigger operation on the interaction control, wherein content displayed on the target page is correlated with content displayed on the target image frame; and
jumping from the target page to a video play interface in response to a return operation triggered on the target page, and continuing to play the target video on the video play interface based on the target image frame.

2. The method according to claim 1, wherein before displaying the target page in response to the trigger operation on the interaction control, the method further comprises:
continuing to play the target video based on the target image frame, in response to a display duration of the obscuration on a video play interface reaching a predetermined stay duration; or
continuing to play the target video based on the target image frame, in response to a reception of a playing resuming operation triggered on the obscuration on the video play interface.

3. The method according to claim 1, wherein before displaying the target page, in response to the trigger operation on the interaction control, the method further comprises:
displaying, on the obscuration, an operation prompt corresponding to the interaction control, wherein the operation prompt is used to guide a user to perform the trigger operation on the interaction control.

4. The method according to claim 1, further comprising:
playing an audio prompt or a vibration prompt in response to the trigger operation on the interaction control.

5. The method according to claim 1, wherein the trigger operation on the interaction control comprises: a click operation on the interaction control, or an operation of dragging the interaction control to a target region.

6. A video processing method, comprising:
generating an interaction control on an obscuration based on a target element on a target image frame, in response to a reception of a select operation on the target element on the target image frame of a to-be-processed video, wherein a display region of the interaction control on the obscuration has a same position as a display region of the target element on the target image frame, the interaction control has a same or similar display image as the target element, the interaction control is used to trigger a display of a target page, and content displayed on the target page is correlated with content displayed on the target image frame; and
inserting the obscuration between the target image frame and a first image frame of the to-be-processed video, to obtain a target video corresponding to the to-be-processed video, wherein the first image frame is an image frame next to the target image frame in the to-be-processed video, and the target video comprises at least one image frame in which the obscuration is displayed, wherein in a case that the target image frame in the target video is played, the obscuration is displayed and the target video is paused; and in a case that a return operation is triggered on the target page, the target page is jumped to a video play interface and the target video continues to be played on the video play interface.

7. The method according to claim 6, wherein generating the interaction control on the obscuration based on the target element on the target image frame comprises:
determining display position information of the target element on the target image frame; and
generating the interaction control on the obscuration based on the display position information.

8. The method according to claim 7, wherein after generating the interaction control on the obscuration based on the display position information, the method further comprises:
determining display position information of a display element corresponding to the target element, on the target image frame; and
determining, on the obscuration, a target region corresponding to the interaction control, based on the display position information of the display element, wherein an operation of dragging the interaction control to the target region is used to trigger the display of the target page.

9. The method according to claim 6, further comprising:
determining a predetermined stay duration corresponding to the obscuration, wherein the predetermined stay duration is used to control a display duration of the obscuration.

10. A non-transitory computer readable storage medium, wherein instructions is stored on the computer readable storage medium, and the instructions, when executed on a terminal device, cause the terminal device to:
display an obscuration including an interaction control on a play interface corresponding to a target image frame of a target video and pause the target video, in response to playing the target image frame of the target video; display a target page in response to a trigger operation on the interaction control, wherein content displayed on the target page is correlated with content displayed on the target image frame; and jump from the target page to a video play interface in response to a return operation triggered on the target page, and continue to play the target video on the video play interface based on the target image frame; or generate an interaction control on an obscuration based on a target element on a target image frame, in response to a reception of a select operation on the target element on the target image frame of a to-be-processed video, wherein the interaction control is used to trigger a display of the target page; and insert the obscuration between the target image frame and a first image frame in the to-be-processed video, to obtain a target video corresponding to the to-be-processed video, wherein the first image frame is an image frame next to the target image frame in the to-be-processed video, and the target video comprises at least one image frame in which the obscuration is displayed, wherein in a case that the target image frame in the target video is played, the obscuration is displayed and the target video is paused; and in a case that a return operation is triggered on the target page, the target page is jumped to a video play interface and the target video continues to be played on the video play interface, wherein a display region of the interaction control on the obscuration has a same position as a display region of a target element on the target image frame, and the interaction control has a same or similar display image as the target element, and content displayed on the target page is correlated with content displayed on the target image frame.

11. A device, comprising a memory, a processor, and a computer program stored on the memory and executable on the processor, wherein the computer program, when executed on the processor, cause the processor to:

display an obscuration including an interaction control on a play interface corresponding to a target image frame of a target video and pause the target video, in response to playing the target image frame of the target video; and display a target page in response to a trigger operation on the interaction control, wherein content displayed on the target page is correlated with content displayed on the target image frame; and jump from the target page to a video play interface in response to a return operation triggered on the target page, and continue to play the target video on the video play interface based on the target image frame; or generate an interaction control on an obscuration based on a target element on a target image frame, in response to a reception of a select operation on the target element on the target image frame of a to-be-processed video, wherein the interaction control is used to trigger a display of the target page; and insert the obscuration between the target image frame and a first image frame in the to-be-processed video, to obtain a target video corresponding to the to-be-processed video, wherein the first image frame is an image frame next to the target image frame in the to-be-processed video, and the target video comprises at least one image frame in which the obscuration is displayed, wherein in a case that the target image frame in the target video is played, the obscuration is displayed and the target video is paused; and in a case that a return operation is frame in the to-be-processed video, to obtain a target video corresponding to the to-be-processed video, wherein the first image frame is an image frame next to the target image frame in the to-be-processed video, and the target video comprises at least one image frame in which the obscuration is displayed, wherein in a case that the target image frame in the target video is played, the obscuration is displayed and the target video is paused; and in a case that a return operation is triggered on the target page, the target page is jumped to a video play interface and the target video continues to be played on the video play interface, wherein a display region of the interaction control on the obscuration has a same position as a display region of a target element on the target image frame, and the interaction control has a same or similar display image as the target element, and content displayed on the target page is correlated with content displayed on the target image frame.

12. The device according to claim 11, wherein the computer program, when executed on the processor, cause the processor to:

continue to play the target video based on the target image frame, in response to a display duration of the obscuration on a video play interface reaching a predetermined stay duration; or continue to play the target video based on the target image frame, in response to a reception of a playing resuming operation triggered on the obscuration on the video play interface.

13. The device according to claim 11, wherein the computer program, when executed on the processor, cause the processor to:

display, on the obscuration, an operation prompt corresponding to the interaction control, wherein the operation prompt is used to guide a user to perform the trigger operation on the interaction control.

14. The device according to claim 11, wherein the computer program, when executed on the processor, cause the processor to:

play an audio prompt or a vibration prompt in response to the trigger operation on the interaction control.

15. The device according to claim 11, wherein the trigger operation on the interaction control comprises: a click operation on the interaction control, or an operation of dragging the interaction control to a target region.

16. The device according to claim 11, wherein the computer program, when executed on the processor, cause the processor to:

determine display position information of the target element on the target image frame; and generate the interaction control on the obscuration based on the display position information.

17. The device according to claim 16, wherein the computer program, when executed on the processor, cause the processor to:

determine display position information of a display element corresponding to the target element, on the target image frame; and determine, on the obscuration, a target region corresponding to the interaction control, based on the display position information of the display element, wherein an operation of dragging the interaction control to the target region is used to trigger the display of the target page.

18. The device according to claim 11, wherein the computer program, when executed on the processor, cause the processor to:

determine a predetermined stay duration corresponding to the obscuration, wherein the predetermined stay duration is used to control a display duration of the obscuration.

* * * * *